United States Patent
Kuo (10) Patent No.: US 10,592,035 B2
(45) Date of Patent: Mar. 17, 2020

(54) PRESSURE SENSOR AND PRESSURE SENSING METHOD

(71) Applicant: ACER INCORPORATED, New Taipei (TW)

(72) Inventor: Jin-Ting Kuo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 179 days.

(21) Appl. No.: 15/861,646

(22) Filed: Jan. 3, 2018

(65) Prior Publication Data

US 2019/0073076 A1 Mar. 7, 2019

(30) Foreign Application Priority Data

Sep. 7, 2017 (TW) .............................. 106130539 A (51) Int. Cl.
| | | |
|---|---|---|
| G06F 3/041 | (2006.01) | |
| G01L 1/14 | (2006.01) | |
| G06F 3/044 | (2006.01) | |

(52) U.S. Cl.
CPC .............. *G06F 3/0414* (2013.01); *G01L 1/14* (2013.01); *G06F 3/0418* (2013.01); *G06F 3/044* (2013.01); *G06F 2203/04105* (2013.01); *G06F 2203/04112* (2013.01); *G09G 2310/0264* (2013.01)

(58) Field of Classification Search
CPC ......... G06F 3/044; G06F 3/045; G06F 3/0414
See application file for complete search history.

(56) References Cited

U.S. PATENT DOCUMENTS

| | | | | |
|---|---|---|---|---|
| 4,734,034 A | * | 3/1988 | Maness | A61C 19/05 338/99 |
| 4,739,299 A | * | 4/1988 | Eventoff | G06F 3/045 338/114 |
| 4,810,992 A | * | 3/1989 | Eventoff | G06F 3/045 338/114 |
| 4,856,993 A | * | 8/1989 | Maness | A61C 19/05 433/68 |
| 5,159,159 A | * | 10/1992 | Asher | G01L 1/205 178/18.05 |
| 8,266,971 B1 | * | 9/2012 | Jones | G01L 1/146 73/862.046 |
| 2010/0265170 A1 | * | 10/2010 | Norieda | G06F 3/011 345/156 |
| 2011/0148811 A1 | * | 6/2011 | Kanehira | G06F 3/044 345/174 |
| 2013/0191057 A1 | * | 7/2013 | Ben Shalom | A61B 5/103 702/64 |
| 2015/0091859 A1 | * | 4/2015 | Rosenberg | G06F 3/044 345/174 |

(Continued)

*Primary Examiner* — Sepehr Azari
(74) *Attorney, Agent, or Firm* — Winston Hsu (57) ABSTRACT

A pressure sensor, comprises a first electrode plate; a plurality of second electrode plates; an elastic member, disposed between the first electrode plate and the plurality of second electrode plates; a first switch, comprising a first end coupled to the first electrode plate, and a second end selectively coupled to a first plate receiving end or a ground; and a plurality of second switches, wherein each second switch comprises a first end coupled to one of the plurality of second electrode plates, and a second end selectively coupled to a second plate receiving end, the ground or a driving signal end.

10 Claims, 8 Drawing Sheets

(56) References Cited

U.S. PATENT DOCUMENTS

| | | | |
|---|---|---|---|
| 2016/0378255 A1* | 12/2016 | Butler | G01L 1/146 |
| | | | 345/174 |
| 2017/0068383 A1* | 3/2017 | Chern | G06F 3/0416 |
| 2017/0269773 A1* | 9/2017 | Suzuki | G06F 3/0416 |
| 2018/0039367 A1* | 2/2018 | Suzuki | G06F 3/0414 |
| 2018/0088702 A1* | 3/2018 | Shutzberg | G06F 3/044 |
| 2018/0232096 A1* | 8/2018 | Cheng | G06F 3/0416 |
| 2019/0121465 A1* | 4/2019 | Seo | G01L 1/146 |

* cited by examiner

PRESSURE SENSOR AND PRESSURE SENSING METHOD

BACKGROUND OF THE INVENTION

1. Field of the Invention

This present invention relates to a pressure sensor and a pressure sensing method, and more particularly, to a pressure sensor and a pressure sensing method capable of adjusting according to the touching force and the capacitance.

2. Description of the Prior Art

As the technology evolves, the touch device has been widely used in daily life. The touch control electronic device may determine the operating point of the user and determine the magnitude of the different touching forces so as to further expand the touch control function of the touch device and improve the user's experience.

Figure 1:
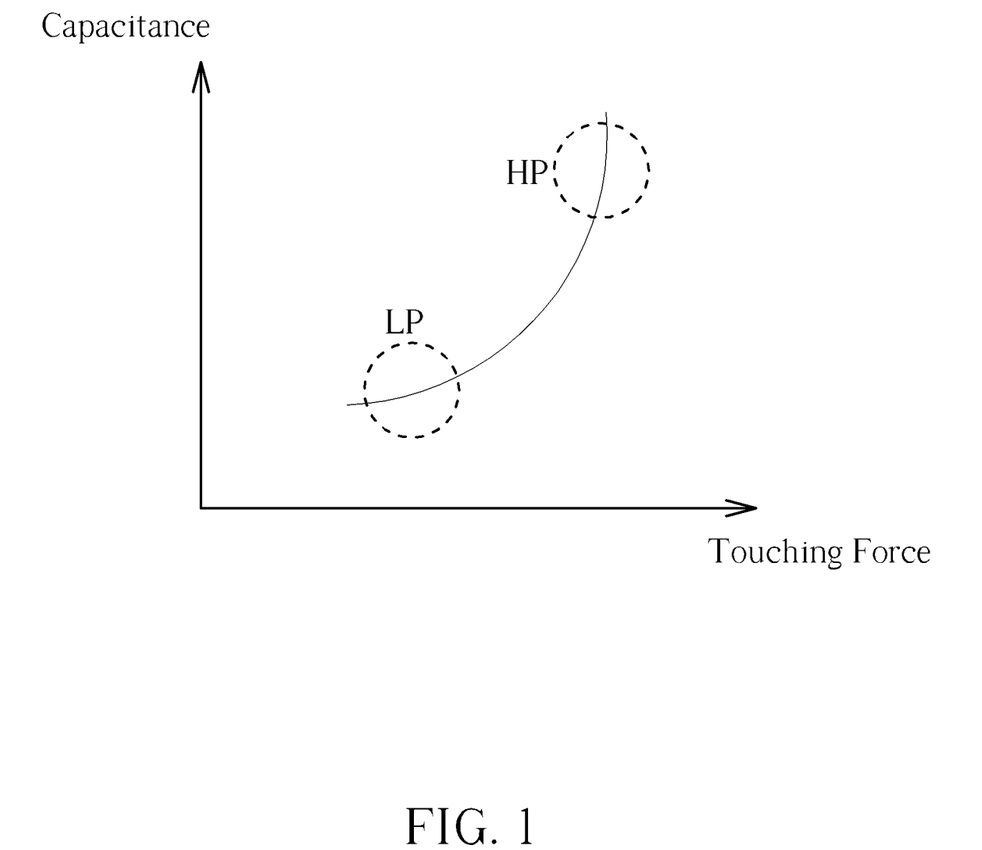
FIG. 1 is a schematic diagram of the relationship of the capacitance detected by the conventional method of capacitive sensing and touching force.

The conventional touch control device may determine the touching force by the capacitive sensing method. For example, an elastic member is disposed between two electrodes and a touching force is determined according to the capacitance detected by the electrodes. When the touching force is applied on the electrodes, the capacitance detected by the electrodes accordingly changes. However, the common issue is the nonlinearity between the changes in the capacitance and the touching force, resulting in the inconsistency in the sensitivity of the touch control. Please refer to FIG. 1, which is a schematic diagram of the relationship of the capacitance detected by the conventional method of capacitive sensing and touching force. Under the circumstance that the volume of the elastic member is consistent, the thickness of the elastic member is inverse proportional to the cross-section area of the elastic member. In addition, the capacitance of the elastic member is proportional to the cross-sectional area of the elastic member and inverse proportional to the thickness of the elastic member. As shown in FIG. 1, within the low pressure region (LP), when the touching force substantially increases, the capacitance changes slightly. Within the high pressure region (HP), when the touching force slightly increases, the capacitance substantially increases. Therefore, due to the nonlinearity between the detected capacitance and the touching force of the conventional touch control device, the touch control sensitivity is inconsistent for the user to operate the touch control function, thus causing a bad user experience for the user. Therefore, how to provide a corresponding linear signal feedback according to the touching force to improve the user satisfaction when operating the touch control device is a significant objective in the field.

SUMMARY OF THE INVENTION

It is therefore a primary objective of the present invention to provide a pressure sensor and a method of pressure sensing capable of providing the corresponding linear signal feedback according to the touching force.

The present invention discloses a pressure sensor, comprising: a first electrode plate; a plurality of second electrode plates; an elastic member, disposed between the first electrode plate and the plurality of second electrode plates; a first switch, comprising a first end coupled to the first electrode plate, and a second end selectively coupled to a first plate receiving end or a ground; and a plurality of second switches, wherein each second switch comprises a first end coupled to one of the plurality of second electrode plates, and a second end selectively coupled to a second plate receiving end, the ground or a driving signal end.

The present invention further discloses a pressure sensing method, applied for a pressure sensor, the pressure sensor comprises an elastic member, a first electrode plate and a plurality of second electrode plates, the elastic member is disposed between the first electrode plate and the plurality of second electrode plates, the pressure sensing method comprises: setting up a plate connection configuration, the plate connection configuration comprises at least a part of the plurality of second electrode plates connected to a ground or switched to a floating state and the remaining second electrode plates connected to a driving signal end; and applying different forces on the first electrode plate, and detecting the first capacitance and the compressed electrode area corresponding to different forces according to the plate connection configuration; and storing the corresponding relationship between the first capacitance and area of the compressed electrode of the plate connection configuration corresponding to different forces.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
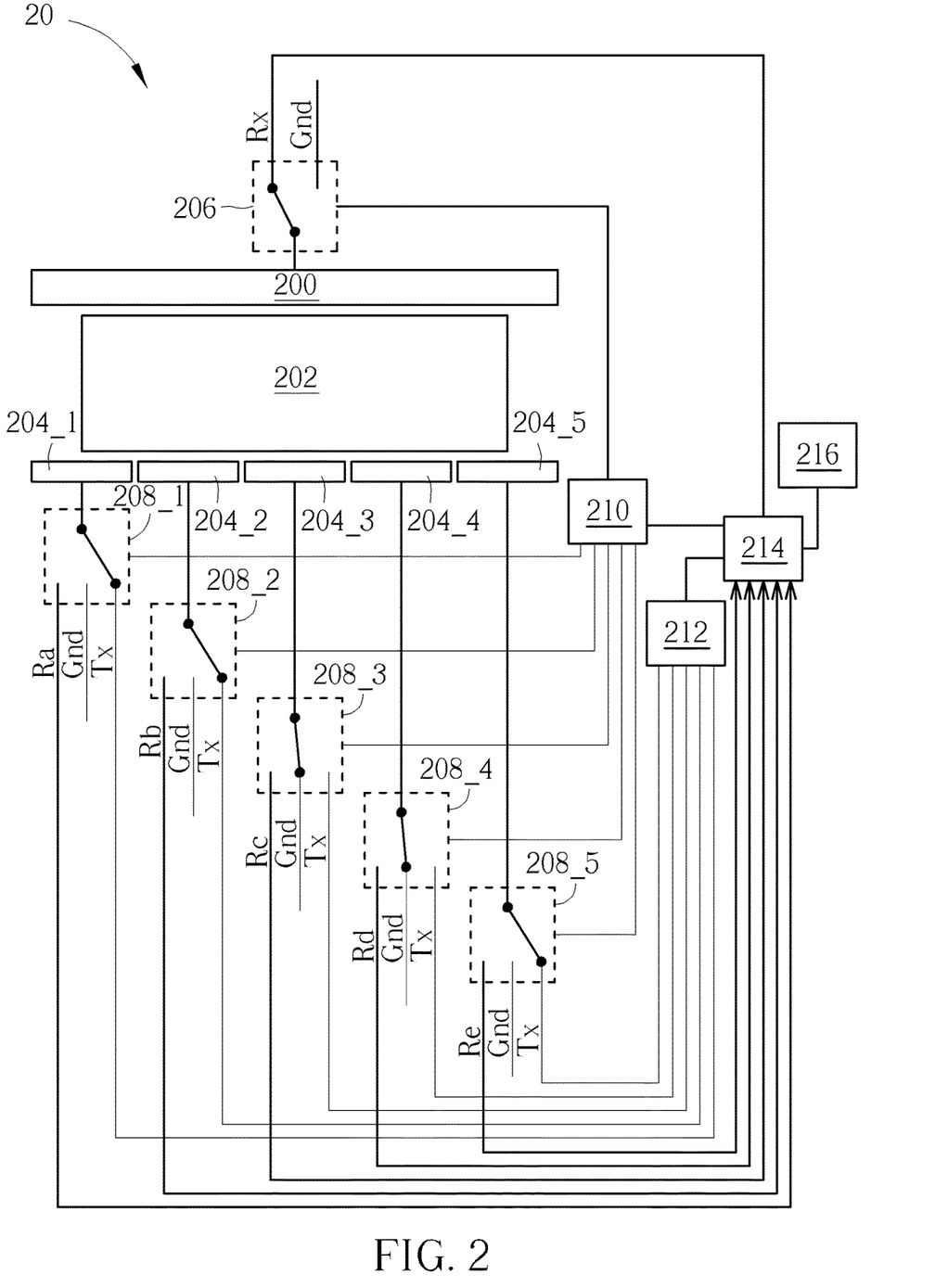
FIG. 2 is a schematic diagram of a pressure sensor according to an embodiment of the present invention.
Figure 3:
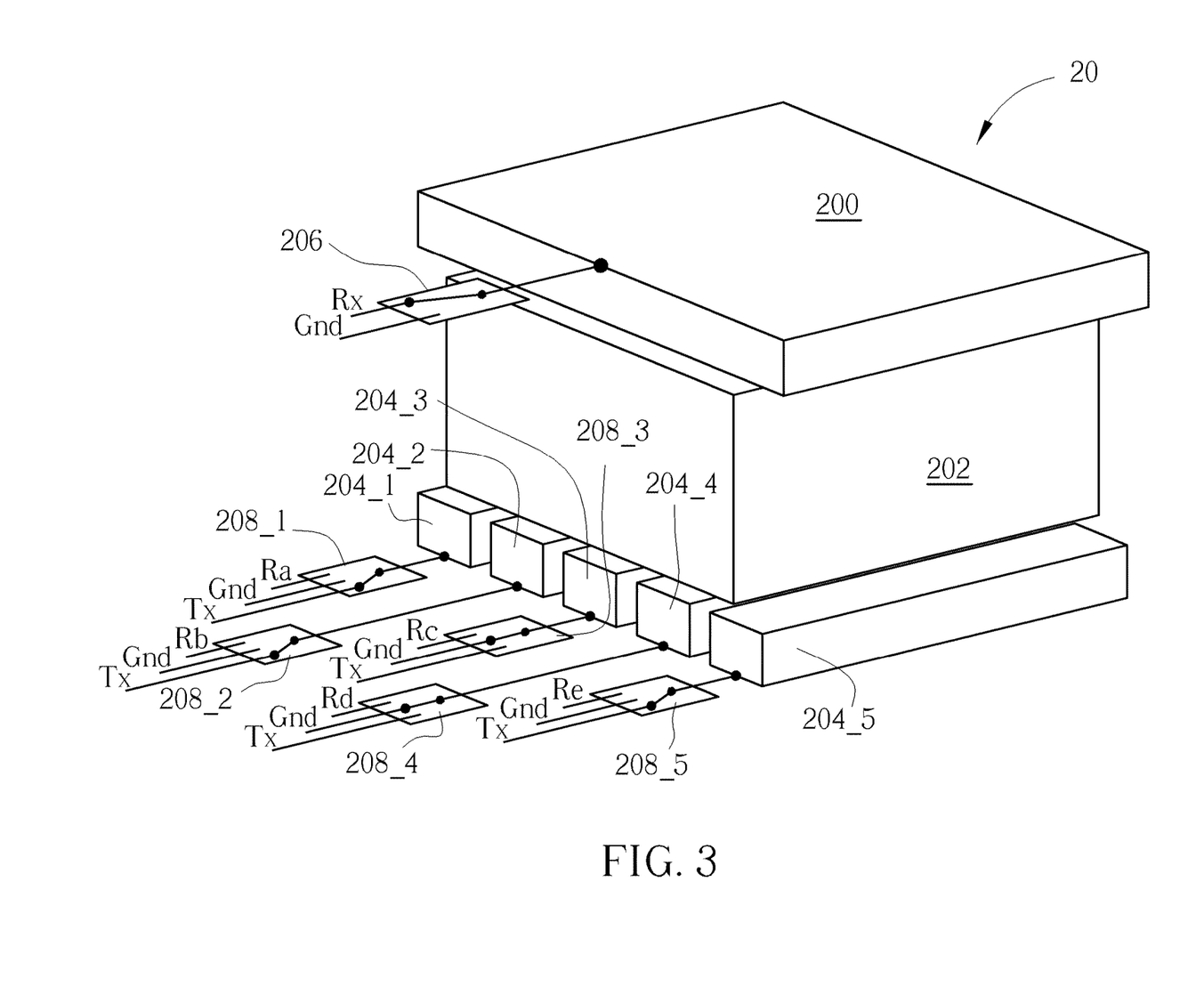
FIG. 3 is a perspective view of the pressure sensor shown in FIG. 2.

Please refer to FIG. 2 and FIG. 3. FIG. 2 is a schematic diagram of a pressure sensor 20 according to an embodiment of the present invention. FIG. 3 is a perspective view of the pressure sensor 20 shown in FIG. 2. The pressure sensor 20 is utilized in many kinds of touch control electronic devices, such as tablets, smart phones, smart bracelets, smart watches, etc. The pressure sensor 20 includes a first electrode plate 200, an elastic member 202 and second electrode plates 204_1-204_5. The elastic member 202 is a three-dimensional object with elasticity, disposed between the first electrode plate 200 and the second electrode plates 204_1-204_5 and capable of elastic deformation according to an external force. When the external force is applied on the first electrode plate 200, an elastic deformation of the elastic member 202 occurs according to the magnitude of the external force. Under such a circumstance, the cross-sectional area of the elastic member 202 changes, and the distance between the first electrode plate 200 and the second electrode plates 204_1-204_5 also changes and the corresponding capacitances between the first electrode plate 200 and the second electrode plates 204_1-204_5 are generated accordingly.

In addition, the pressure sensor 20 further includes a first switch 206, second switches 208_1-208_5, a control unit 210, a driving unit 212, a processing unit 214 and a storage unit 216. The first switch 206 includes a first end and a second end, wherein the first end of the first switch 206 is coupled to the first electrode plate 200 and the second end of the first switch 206 is selectively coupled to a first plate receiving end Rx or a ground Gnd. For example, when the second end of the first switch 206 is coupled to the first plate receiving end Rx, the processing unit 214 is able to receive the sensing signal from the first plate receiving end Rx to determine a first capacitance between the first electrode plate 200 and the second electrode plates 204_1-204_5. Meanwhile, the first capacitance may be a total capacitance between the first electrode plate 200 and the second electrode plates 204_1-204_5. Each second switch respectively corresponds to a second electrode plate, each second switch includes a first end and a second end, wherein the first end of each second switch is coupled to the corresponding second electrode plate, and the second end of each second switch is selectively coupled to a second plate receiving end, the ground Gnd or a driving signal end Tx. For example, as shown in FIG. 2, the first end of the second switch 208_1 is coupled to the second electrode plate 204_1, and the second end of the second switch 208_1 is selectively coupled to the second plate receiving end Ra, the ground Gnd or the driving signal end Tx. The first end of the second switch 208_2 is coupled to the second electrode plate 204_2, and the second end of the second switch 208_2 is selectively coupled to the second plate receiving end Rb, the ground Gnd or the driving signal end Tx, and so on. In an embodiment of the present invention, when the second end of the first switch 206 is coupled to the ground Gnd and the second end of the second switch 208_1 is coupled to the second plate receiving end Ra, the processing unit 214 is able to receive the sensing signal from the second plate receiving end Ra and determine a second capacitance between the first electrode plate 200 and the second electrode plate 204_1 according to the sensing signal from the second plate receiving end Ra. Meanwhile, the second capacitance may be an individual capacitance between the second electrode plate 204_1 and the first electrode plate 200, and so on.

The control unit 210 is utilized for generating a control signal to control the operation of the first switch 206 and the second switches 208_1-208_5. For example, according to the control signal generated by the control unit 210, the second end of the first switch 206 may be connected to the first plate receiving end Rx or the ground Gnd, so as to connect the first electrode plate 200 to the first plate receiving end Rx or the ground Gnd. For example, according to the control signal generated by the control unit 210, the second ends of the second switches 204_1-204_5 may be connected to the corresponding second plate receiving end Ra-Re, the ground Gn or the driving signal end Tx. The driving unit 212 is coupled to the driving signal end Tx for generating the driving signal. The driving signal generated by the driving unit 212 may be transmitted to the second electrode plate which is connected to the driving signal end Tx. The processing unit 214 is coupled to the first plate receiving end Rx and the second plate receiving end Ra-Re. During normal operation, the processing unit 214 receives a first sensing signal S through the first plate receiving end Rx and accordingly determining a first capacitance C corresponding to a first force. During test operation, the processing unit 214 receives the corresponding sensing signal through the first plate receiving end Rx and the second plate receiving ends Ra-Re within a testing duration to determine the corresponding relationship between the first capacitance and the area of the compressed electrode corresponding to different forces.

Furthermore, the control unit 210 may generate the corresponding control signal to control the operation of the first switch 206 and the second switches 208_1-208_5 according to the selected plate connection configuration. For example, the plate connection configuration may include at least a part of the second electrode plates 204_1-204_5 coupled to the ground Gnd or to be at a floating state and the remaining second electrode plates coupled to the driving signal end Tx. For example, assuming a first plate connection configuration includes the second electrode plates 204_1, 204_2 and 204_5 coupled to driving signal end Tx and the second electrode plates 204_3, 204_4 coupled to the ground Gnd, such that the control unit 210 may generate the corresponding control signal according to the first plate connection configuration. As shown in FIG. 2 and FIG. 3, one end of the second switch 208_1 is connected to the second electrode plate 204_1 and another end of the second switch 208_1 is connected to the driving signal end Tx according to the control signal so as to connect the second electrode plate 204_1 to the driving signal end Tx. One end of the second switch 208_2 is connected to the second electrode plate 204_2 and another end of the second switch 208_2 is connected to the driving signal end Tx so as to connect the second electrode plate 204_2 to the driving signal end Tx. One end of the second switch 208_5 is connected to the second electrode plate 204_5 and another end of the second switch 208_5 is connected to the driving signal end Tx so as to connect the second electrode plate 204_5 to the driving signal end Tx. One ends of the second switches 208_3, 208_4 are respectively connected to the second electrode plates 204_3, 204_4, and another ends of the second switches 208_3, 208_4 are respectively connected to the ground Gnd according to the control signal, such that the driving signal generated by the driving unit 212 is delivered to the second electrode plates 204_1, 204_2, 204_5. Meanwhile, the second electrode plates 204_3, 204_4 are coupled to the ground Gnd without receiving the driving signal. Furthermore, according to the control signal, one end of the first switch 206 is connected to the first electrode plate 200 and another end of the first switch 206 is connected to the first plate receiving end Rx so as to connect the first electrode plate 200 to the first plate receiving end Rx. Under such a circumstance, the processing unit 214 may receive the corresponding sensing signal from the first plate receiving end Rx to determine the corresponding first capacitance so as to determine the magnitude of the external force according to the first capacitance.

In brief, the elastic deformation of the elastic member 202 changes the distance between the first electrode plate and the second electrode plate and accordingly the capacitance between the first electrode plate and the second electrode plate changes. The pressure sensor 20 senses the corresponding capacitance and determines the force applied by the user according to the corresponding capacitance. When the force is applied on the elastic member 202 and accordingly an elastic deformation the elastic member 202 occurs, the cross-section area and the thickness of the elastic member 202 changes, and the capacitive medium between part of the second electrode plates 204_1-204_5 and the first electrode plate 200 changes (i.e. the capacitive medium of partial area is changed from the air to the elastic member 202), so that the total capacitance between the first electrode plate 200 and the second electrode plates 204_1-204_5 changes. Meanwhile, the pressure sensor 20 may generate the corresponding control signal according to the selected plate connection configuration to control the operation of the first switch 206 and the second switches 204_1-204_5. For example, as shown in FIG. 3, the cross-section area of the elastic member 202 covers the second electrode plates 204_1-204_5. In addition, the second electrode plates 204_1, 204_2, 204_5 are connected to the driving signal end Tx and the second electrode plates 204_3, 204_4 are connected to the ground Gnd according to the first plate connection configuration. Therefore, the pressure sensor 20 may detect the capacitance on the first electrode plate 200 corresponding to the touching force. In other words, the pressure sensor 20 may connect a portion of the second electrode plates 204_1-204_5 to the ground Gnd or switch them to the floating state and connect the remaining part of the second electrode plates 204_1-204_5 to the driving unit 212 to receive the driving signal according to the requirements of the user so as to improve the issue of the nonlinear sensing and the inconsistency in the sensitivity.

Figure 4:
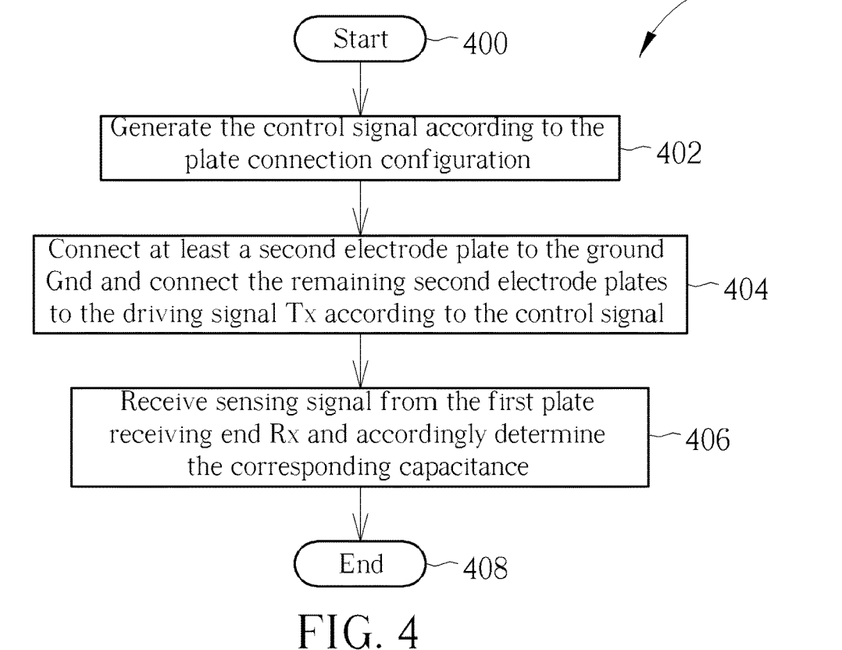
FIG. 4 is a schematic diagram of a pressure sensing process according to an embodiment of the present invention.

During normal operation, the operation of the pressure sensor 20 can be summarized as a process 40. Please refer to FIG. 4, which is a schematic diagram of a pressure sensing process 40 according to an embodiment of the present invention. The process 40 includes the following steps:

Step 400: Start.

Step 402: Generate the control signal according to the plate connection configuration.

Step 404: Connect at least a second electrode plate to the ground Gnd and connect the remaining second electrode plates to the driving signal Tx according to the control signal.

Step 406: Receive sensing signal from the first plate receiving end Rx and accordingly determine the corresponding capacitance.

Step 408: End.

According to the process 40, in Step 402, the control unit 210 may generate the corresponding control signal to control the first switch 206 and the second switch 208_1-208_5 according to the selected plate connection configuration, wherein the selected plate connection configuration can be a predetermined plate connection configuration or a plate connection configuration selected by the user. For example, assuming the selected plate connection configuration is a first plate connection configuration, which includes the second electrode plates 204_1, 204_2, 204_5 coupled to the driving signal end Tx and the second electrode plates 204_3, 204_4 coupled to the ground Gnd. The user may inform the control unit 210 that the selected plate connection configuration is first plate connection configuration through a software method or a hardware method.

In Step 404, at least a part of the second electrode plates 204_1-204_5 is connected to the ground Gnd or switched to the floating state, and the remaining second electrode plates are connected to the driving signal end Tx according to the control signal. For example, if the selected plate connection configuration is the first plate connection configuration, the second electrode plates 204_1, 204_2, 204_5 are respectively connected to the driving signal end Tx through the operations of the second switches 208_1, 208_2, 208_5 according to the control signal generated by the control unit 210. The second electrode plates 204_3,204_4 are respectively connected to the ground Gnd through the operations of the second switches 208_3, 208_4 according to the control signal generated by the control unit 210.

In Step 406, when the user applies force on the first electrode plate 200, the processing unit 214 receives a sensing signal from the first plate receiving end Rx, and accordingly determines the corresponding capacitance, such that the processing unit 214 may determine the magnitude of the touching force applied by the user according to the capacitance.

Figure 5:
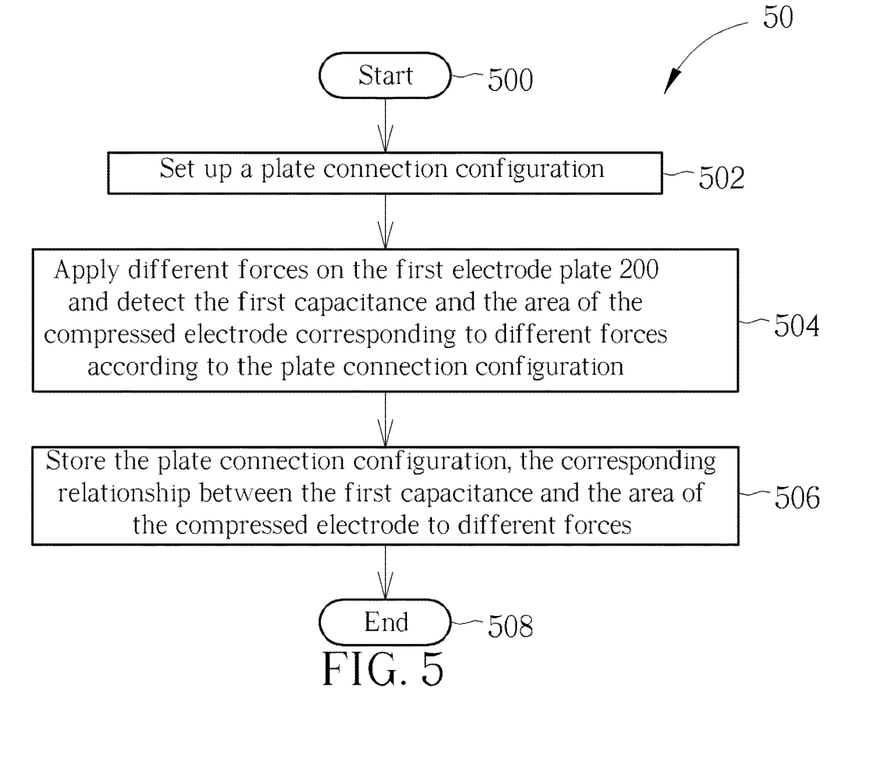
FIG. 5 is a schematic diagram of a pressure sensing process according to an alternative embodiment of the present invention.

On the other hand, for providing more options of plate connection configurations and optimization adjustments for the user, the operation of the pressure sensor 20 during testing operation may be summarized as a process 50. Please refer to FIG. 5, which is a schematic diagram of a pressure sensing process 50 according to an embodiment of the present invention. The process 50 includes the following steps:

Step 500: Start.

Step 502: Set up a plate connection configuration.

Step 504: Apply different forces on the first electrode plate 200 and detect the first capacitance and the area of the compressed electrode corresponding to different forces according to the plate connection configuration.

Step 506: Store the plate connection configuration, the corresponding relationship between the first capacitance and the area of the compressed electrode to different forces.

Step 508: End.

The pressure sensor 20 is capable of setting up different plate connection configurations according to the process 50 to adjust the connection of the second switch through the plate connection configuration so as to obtain the first capacitances and the areas of the compressed electrode corresponding to different forces. Since the area of the compressed electrode is related to the touching force, the area of the compressed electrode can be a reference index for the touching force. The corresponding relationship between the first capacitance and the area of the compressed electrode based on the plate connection configuration corresponding to different forces (e.g., the characteristic curve of the touching force and the capacitance between the first electrode plate 200 and the second electrode plates 204_1-204_5) can be obtained through the process 50. The characteristic curve changes according to the different plate connection configurations. The pressure sensor 20 is able to measure the characteristic curve of the touching force and the capacitance corresponding to various plate connection configurations, and select the plate connection configuration which meets the requirements of the user best so as to provide the selected plate connection configuration for performing the pressure sensing function.

According to the process 50, in Step 502, the processing unit 214 sets up a plate connection configuration The plate connection configuration represents that at least a part of the second electrode plates 204_1-204_5 is set to be connected to the ground Gnd or to be switched to the floating state, and the remaining second electrode plates are set to be coupled to the driving signal end Tx for receiving the driving signal.

In Step 504, the processing unit 214 may indicate the control unit 210 to perform the switching control of the first switch 206 and the second switches 208_1-208_5 according to the plate connection configuration set in Step 502. Under such a circumstance, the capacitances corresponding to different touching forces and the area of the compressed electrode (the cross-section area of the elastic member 202) corresponding to different touching forces may be obtained so as to obtain the characteristic curve of the touching force and the capacitance.

In an embodiment of the present invention, in Step 504, regarding the method for obtaining the capacitances and the area of the compressed electrode corresponding to different touching forces, the processing unit 214 first transmits a plate connection configuration to the control unit 210. The control unit 210 generates the corresponding control signal according to the plate connection configuration, so as to control the second switches 208_1-208. Apart of the second electrode plates 204_1-204_5 are coupled to ground Gnd and the remaining second electrode plates are coupled to the driving signal end Tx through the operations of the second switches 208_1-208_5 based on the control signal. The first electrode plate 200 is coupled to the first plate receiving end Rx through the operation of the first switch 206. Therefore, when a specific force is applied on the first electrode plate 200 of the pressure sensor 20, the processing unit 214 coupled to the first plate receiving end Rx receives the first sensing signal S from the first plate receiving end Rx and accordingly determines a first capacitance C. That is, the first capacitance determined by the processing unit 214 corresponds to the specific force. Note that, since at least a part of the second electrode plates are coupled to the ground Gnd, the first capacitance measured by the processing unit 214 is the capacitance corresponding to the specific force after the adjustment of the plate connection configuration.

In addition, after the processing unit 214 determines the first capacitance corresponding to the specific force, the processing unit 214 indicates the control unit 210 to generate corresponding control signal so as to connect the first electrode plate 200 to the ground Gnd and to connect the second electrode plates 204_1-204_5 to the corresponding second plate receiving ends Ra-Re respectively. For example, the second end of the first switch 206 is switched from the first plate receiving end Rx to the ground Gnd. The second end of the second switch 208_1 is switched from the ground Gnd, the driving signal end Tx or the floating state to the second plate receiving end Ra. The second end of the second switch 208_2 is switched to the second plate receiving end Rb. Similarly, the second end of the second switches 208_3-208_5 are respectively switched to the second plate receiving ends Rc-Re, such that the second electrode plates 204_1-204_5 are respectively connected to the second plate receiving ends Ra-Re. Under such a circumstance, the processing unit 214 respectively receives the second sensing signals S 1-S 5 corresponding to the second electrode plates 204_1-204_5 from the second electrode plates 204_1-204_5 and accordingly determines the second capacitances C_1-C_5 corresponding to the second electrode plates 204_1-204_5. Then, the processing unit 214 determines the compressed second electrode plate from the second electrode plates 204_1-204_5 according to the second capacitances C_1-C_5 and determines the area covered by the compressed second electrode plate so as to obtain the area of the compressed electrode corresponding to the specific force.

Furthermore, since the permittivity of the air is smaller than the permittivity of the elastic member 202, the measured capacitance from the second electrode plate which is not touching the elastic member 202 is smaller than the measured capacitance from the second electrode plate which is touching the elastic member 202. Therefore, the processing unit 214 may accordingly determine an area of the compressed electrode (equivalent to the cross-section area of the elastic member 202). Specifically, for each second electrode plate, the processing unit 214 compares each of the second capacitance measured from each second electrode plate with a predetermined capacitance. When the second capacitance measured from a corresponding second electrode plate is larger than the predetermined capacitance, the processing unit 214 determines the corresponding second electrode plate as a compressed second electrode plate (or the corresponding second electrode plate is touching the elastic member 202). When the second capacitance from a corresponding second electrode plate is smaller than the predetermined capacitance, the processing unit 214 determines the corresponding second electrode plate as a second electrode plate not being compressed (or the corresponding second electrode plate is not touching the elastic member 202). The processing unit 214 adds up the area covered by the second electrode plates which are determined as compressed second electrode plates (or touching the elastic member 202) so as to obtain the area of the compressed electrode corresponding to the specific force. In other words, the processing unit 214 calculates the area covered by the second electrode plates which are determined as the compressed second electrode plate, so as to obtain the area of the compressed electrode corresponding to the specific force. For example, as shown in FIG. 3, when the second capacitances C_1-C_5 corresponding to the second electrode plates 204_1-204_5 are all larger than the predetermined capacitance, the processing unit 214 determines that the second electrode plates 204_1-204_5 are the second electrode plates being compressed (or determines that the second electrode plates 204_1-204_5 are all touching the elastic member 202). The processing unit 214 calculates the total area covered by the second electrode plates 204_1-204_5 as the area of the compressed electrode corresponding to the specific force. Otherwise, when the second capacitance C_1 corresponding to the second electrode plate 204_1 is smaller than or equal to the predetermined capacitance, the processing unit 214 determines that the second electrode plate 204_1 is the second electrode plate not being compressed (or the second electrode plate is not touching the elastic member 202). When the second capacitances C_2-C_5 corresponding to the second electrode plates 204_2-204_5 are all larger than the predetermined capacitance, the processing unit 214 determines the second electrode plates 204_2-204_5 as compressed second electrode plates (or determines that the second electrode plates 204_2-204_5 are all touching the elastic member 202). The processing unit 214 calculates the total area covered by the second electrode plates 204_2-204_5 to obtain the area of the compressed electrode corresponding to the certain force.

Similarly, when a different force is applied on the first electrode plate 200, the processing unit 214 determines the first capacitance corresponding to the force and obtains the area of the compressed electrode corresponding to the different force. After obtaining the first capacitance corresponding to different forces and the area of the compressed electrode corresponding to the different force, the processing unit 214 is able to determine the characteristic curve of the first capacitance and the area of the compressed electrode corresponding to different forces according to the selected plate connection configuration.

Figure 7:
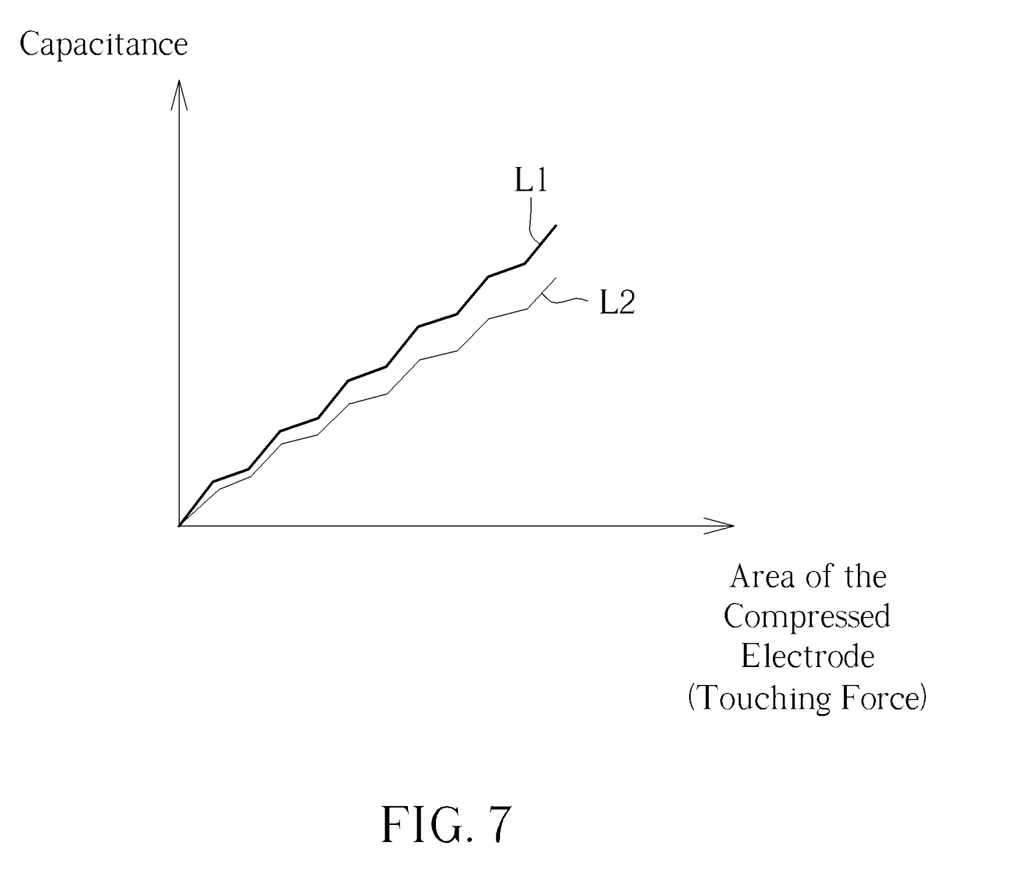
FIG. 7 is a schematic diagram of characteristic curve corresponding to different plate connection configurations according to an embodiment of the present invention.

In Step 506, the processing unit 214 stores the corresponding relationship between the first capacitance and the area of the compressed electrode corresponding to different forces, and the plate connection configuration which is set in Step 202 into the storage unit 216. When selecting the plate connection configuration, the user may select the most suitable plate connection configuration according to the corresponding relationship between the first capacitance and the area of the compressed electrode, and the corresponding plate connection configuration stored in the storage unit 216. For example, please refer to FIG. 7, which is a schematic diagram of characteristic curves corresponding to various plate connection configurations according to an embodiment of the present invention. Based on applying a first plate connection configuration for the second electrode plates, the corresponding relationship between the first capacitance and the area of the compressed electrode obtained by the pressure sensor 20 may be represented by characteristic curve L1. Based on applying a second plate connection configuration for the second electrode plates, the corresponding relationship between the first capacitance and the area of the compressed electrode of the plate connection configuration obtained by the pressure sensor 20 may be represented by the characteristic curve L2. Under such a circumstance, the user may select a plate connection configuration according to the plate connection configurations and the corresponding relationships (i.e. characteristic curve L1 and L2) between the first capacitance and the area of the compressed electrode stored in the storage unit 216.

In brief, the pressure sensor 20 may obtain the first electrode plate capacitances and the areas of the compressed electrodes corresponding to different forces and detect the areas of the compressed electrodes, so as to obtain characteristic curve of the touching force and the capacitance corresponding to different plate connection configurations. In addition, the user is able to select the plate connection configuration by his own demand, or select the plate connection configuration capable of meeting the requirements of the user best by the system according to the characteristic curve of the touching force and the capacitance, so as to perform the pressure sensing function during normal operation according to the selected plate connection configuration.

Figure 6:
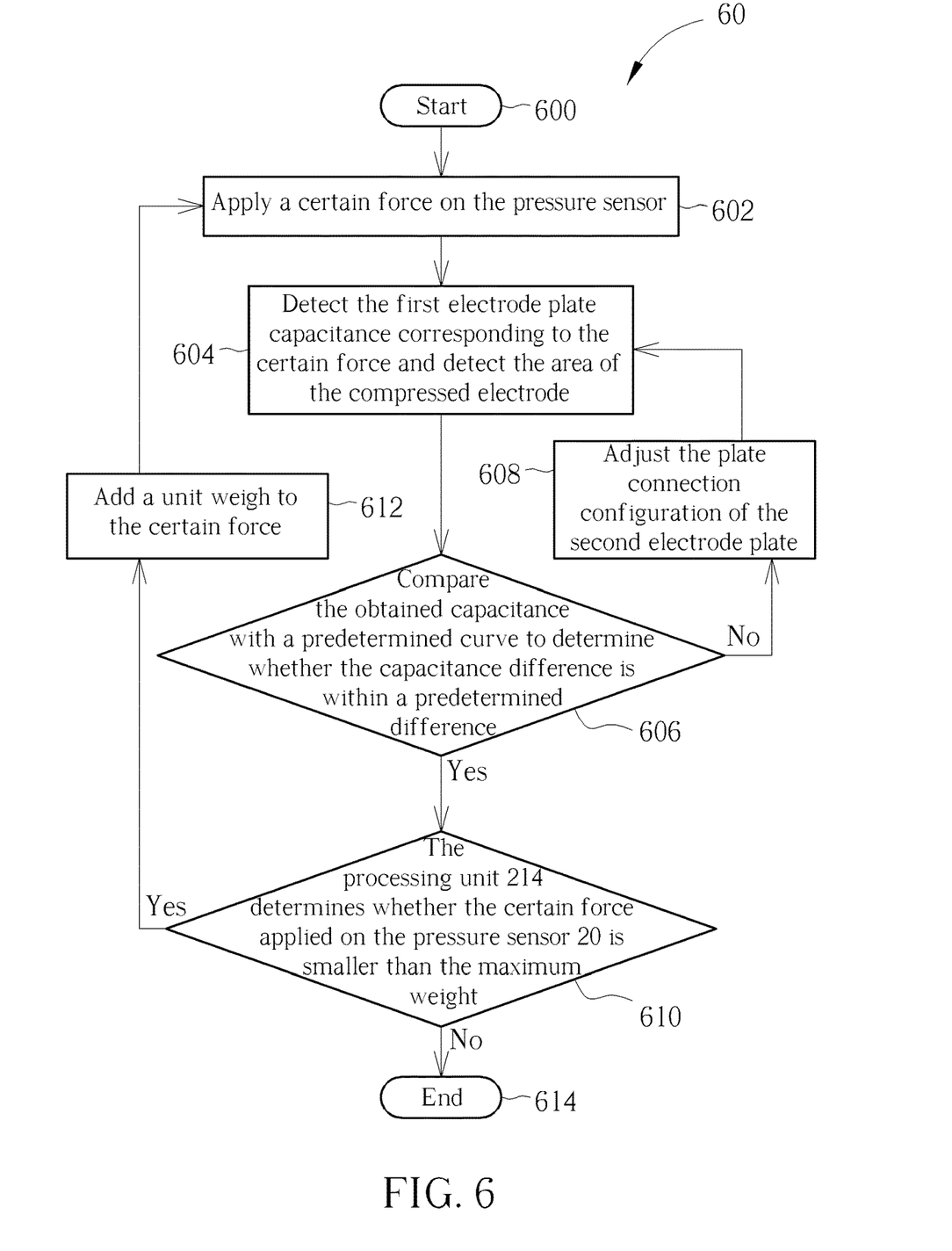
FIG. 6 is a schematic diagram of a pressure sensing process according to an alternative embodiment of the present invention.

Besides, the pressure sensor 20 may obtain and determine a better plate connection configuration according to the different plate connection configurations through process 50, the process 50 may further determine whether the characteristic curve meets the requirements according to the obtained capacitances, so as to instantly adjust the plate connection configuration of the second electrode plate to obtain the linear characteristic curve which meets the requirements. The operation of the instant adjustment of the pressure sensor 20 may be summarized as a process 60. Please refer to FIG. 6, which is a schematic diagram of a pressure sensing process 60 according to an embodiment of the present invention. The process 60 includes the following steps:

Step 600: Start.

Step 602: Apply a certain force on the pressure sensor 20.

Step 604: Detect the first electrode plate capacitance corresponding to the certain force and detect the area of the compressed electrode.

Step 606: Compare the obtained capacitance with a predetermined curve to determine whether the capacitance difference is within a predetermined difference. If yes, go Step 610; if not, go Step 608.

Step 608: Adjust the plate connection configuration of the second electrode plate.

Step 610: The processing unit 214 determines whether the certain force applied on the pressure sensor 20 is smaller than the maximum weight. If yes, go Step 612; if not, go Step 614.

Step 612: Add a unit weigh to the certain force.

Step 614: End.

Therefore, the pressure sensor 20 may instantly detect the capacitance and the area of the compressed electrode according to the process 60, so as to compare them with the predetermined characteristic curve to adjust the characteristic curve of the touching force and the capacitance according to the comparison result.

In detail, when the certain force is applied on the pressure sensor 20 (i.e. the Step 602), the processing unit 214 detects the first capacitance and the area of the compressed electrode (i.e. the Step 604). It is noted that there is a predetermined curve stored in the processing unit 214, which is for determining the linearity of the characteristic curve between the touching force and the capacitance. After the processing unit 214 obtains the first capacitance and the area of the compressed electrode, the processing unit 214 further compares the characteristic curve to the predetermined curve for determining whether the difference between the characteristic curve and the predetermined curve is within a predetermined difference, so as to meet the requirement of linear characteristic of the touching force and the capacitance (i.e. the Step 606). When the comparison result indicates that the capacitance is too large, the processing unit 214 adjusts the plate connection configuration to control a part of the second electrode plates to be connected to the ground Gnd, so as to decrease the detected capacitance between the first electrode plate 200 and second electrode plates. On the contrary, when the capacitance is too small, the processing unit 214 adjusts the plate connection configuration to control a part of the second electrode plates connected to the ground Gnd to cancel their connection to the ground Gnd, so as to maintain the linear characteristic of the touching force and the capacitance (i.e. the Step 608). When the processing unit 214 determines that the obtained capacitance meets the linear characteristic of the predetermined curve, the processing unit 214 further determines whether the applied certain force is smaller than the maximum force (i.e. the Step 610). If the applied certain weight is smaller than the maximum weight, the certain force is increased by a unit weight (e.g., the adjusted certain force is a sum of the certain force used in Step 610 and the unit weight) and further performs detection of the touching force and the capacitances (i.e. the Step 612). If the applied certain force greater than or equal to the maximum weight, the process 60 is finished (i.e. the Step 614).

Note that, compared to the process 50, the pressure sensor 20 may instantly detect the touching force and the capacitance, and accordingly compares the characteristic curve with the predetermined curve stored in the processing unit 214 so as to obtain the plate connection configuration which meets the requirement according to the process 60. According to the process 60, the pressure sensor 20 does not have to obtain the characteristic curve of the touching force and the capacitance corresponding to different plate connection configurations. The pressure sensor 20 may instantly determine and obtain the plate connection configuration which meets the linearity requirement so as to perform the pressure sensing function during the normal operation.

Note that, the embodiments stated in the above are utilized for illustrating the concept of the present invention, and those skilled in the art may make modifications and alterations accordingly, which are not limited herein. For example, the control unit 210 connects a part of the second electrode plates to the ground Gnd is for adjusting the capacitance detected by the first electrode plate 200 according to the plate connection configuration, and this is not limited. The control unit 210 may also switch a part of the second electrode plates to the floating state according to the requirements of the system, as long as the capacitance detected by the first electrode plate 200 is changed. Besides, the arrangements of the second electrode plates is not limited to a single row and in parallel direction, the shape and the size are not limited to rectangular shape and same size. Preferably, the arrangements, the shapes or the sizes of the second electrode plates may be adjusted according to the system requirements so as to obtain better linearity.

Figure 8:
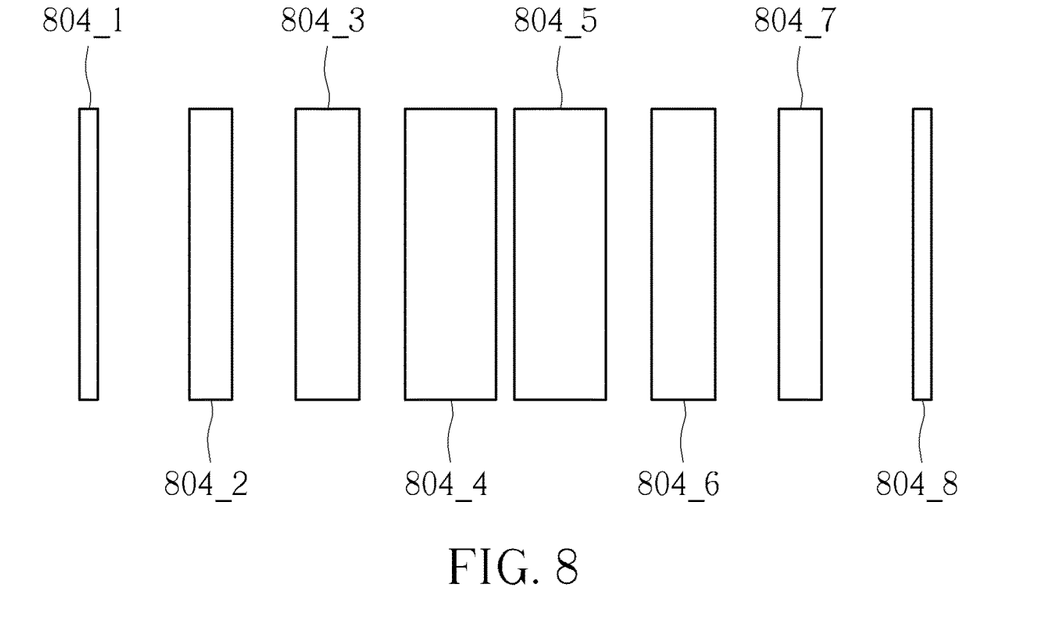
FIG. 8 to FIG. 11 illustrate schematic diagrams of the second electrode plates according to embodiments of the present invention.
Figure 9:
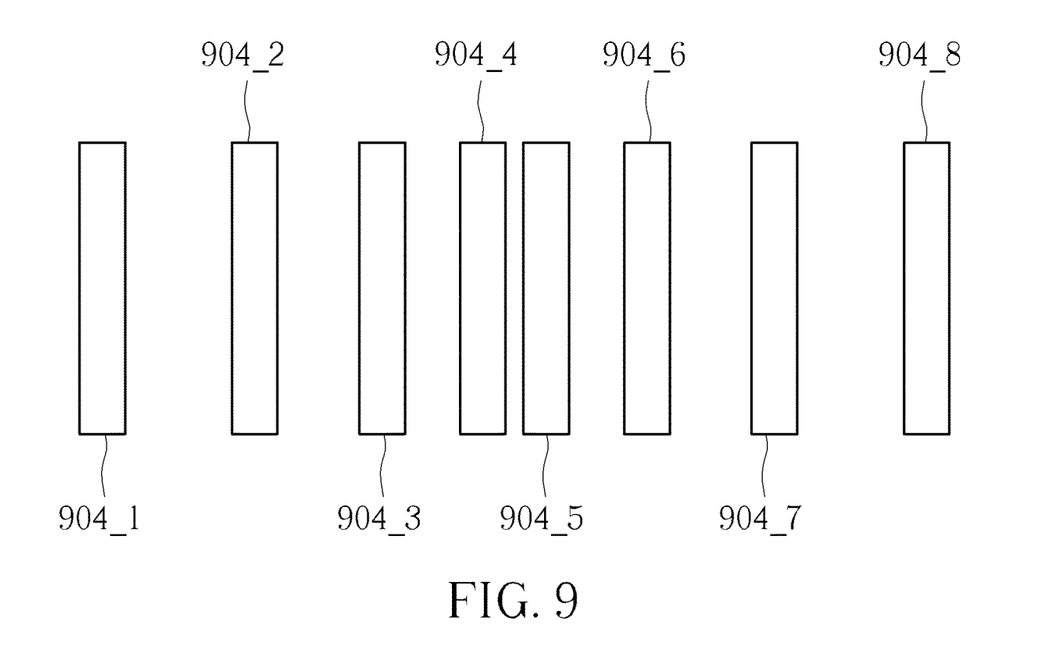
Figure 10:
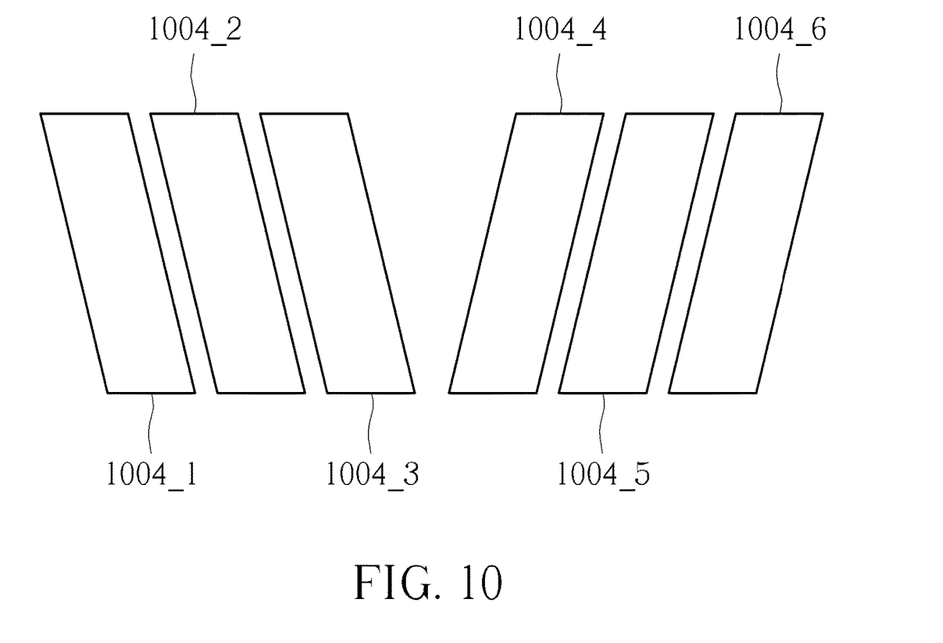
Figure 11:
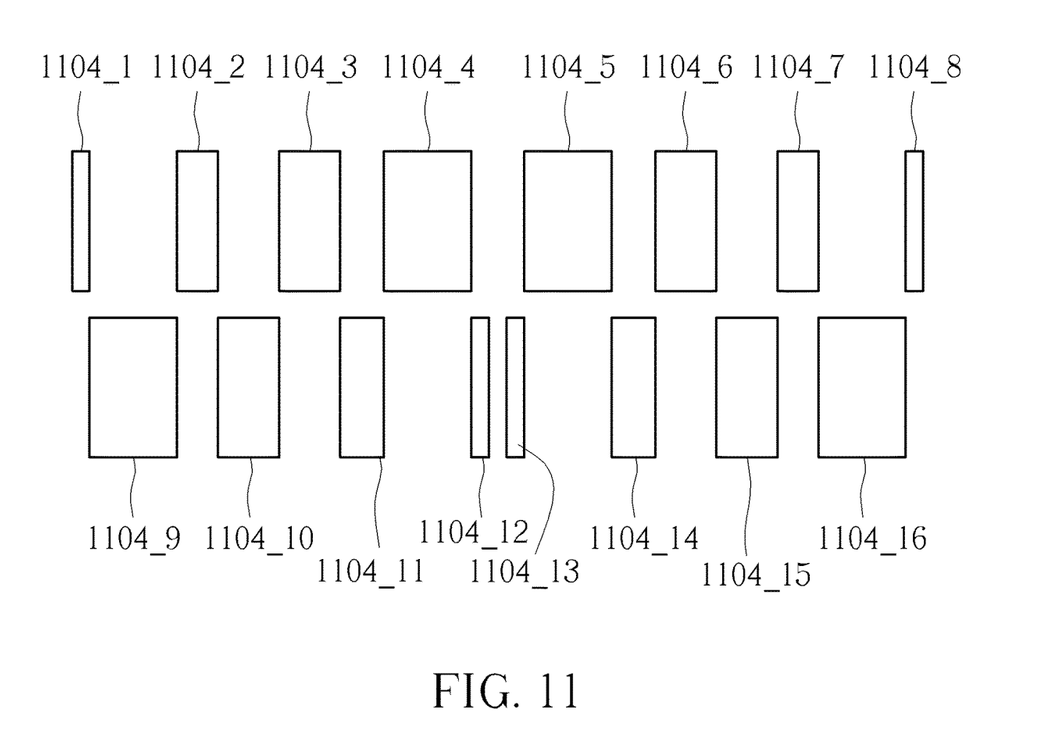

Please refer to FIG. 8 to FIG. 11, wherein FIG. 8 to FIG. 11 illustrate the schematic diagrams of the second electrode plate according to embodiments of the present invention. As shown in FIG. 8, the interval between each two adjacent second electrode plates is the same, the shape of each second electrode plate is rectangular and arranged in parallel direction. The second electrode plate may have different widths. As shown in FIG. 8, the second electrode plates near to a center position have wider widths, and the width of the second electrode plate decrease as the distance from the center position increases. The interval between two adjacent second electrode plates may be different. As shown in FIG. 9, all second electrode plates have the same shape of rectangular and are arranged in parallel direction. However, the interval between each second electrode plate is different, wherein the spacing decreases as the distance from the second to the center increases. As shown in FIG. 10, the second electrode plates are two groups of metal plates in parallelogram shape. The shape of each group of metal plates is the same shape and the direction of each group of metal plates is arranged in parallel direction. Two groups of metal plates are in parallelogram shape and symmetric according to the center. As shown in FIG. 11, the second electrode plates are rectangular metal plates in dual rows. For the rectangular metal plates in the upper row, the rectangular metal plates have larger widths when the metal plate is nearer to the center and the width decreases as the metal plate is farther to the center; for the rectangular metal plates in the lower row, the rectangular metal plates has smaller widths when the metal plate is nearer to the center and the width increase the metal plate is farther to the center.

In summary, the conventional pressure sensor cannot offer linear characteristic between the touching force and the detected capacitance due to structural issues, so as to seriously decrease the user experience when the user is operating pressure sensing function. In comparison, the pressure sensor of the present invention may provide the pressure sensing with an excellent linear characteristic by adjusting the input from the driving signal of the second electrode plate so as to elevate the user experience. In addition, the pressure sensor of the present invention obtains a better linear characteristic curve between the touching force and the capacitance through the detecting of the pressure by the elastic member, detects the capacitance by the first electrode plate and second electrode plates, and the determines the connections of the second electrode plates by the processing unit. Therefore, the user may obtain a suitable linear signal feedback according to the touching force when using the electronic device and thus further improving the user satisfaction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pressure sensor, comprising:
a first electrode plate;
a plurality of second electrode plates;
an elastic member, disposed between the first electrode plate and the plurality of second electrode plates;
a first switch, comprising a first end coupled to the first electrode plate, and a second end selectively coupled to a first plate receiving end or a ground;
a plurality of second switches, wherein each second switch comprises a first end coupled to one of the plurality of second electrode plates, and a second end selectively coupled to a second plate receiving end, the ground or a driving signal end; and
a processing unit, coupled to the first plate receiving end, wherein within a testing duration, the processing unit sets up a plate connection configuration, and when different forces are applied on the first electrode plate, the processing unit detects a capacitance of the first electrode plate corresponding to different forces and detects a compressed electrode area according to the plate connection configuration.

2. A pressure sensor, comprising:
a first electrode plate;
a plurality of second electrode plates;
an elastic member, disposed between the first electrode plate and the plurality of second electrode plates;
a first switch, comprising a first end coupled to the first electrode plate, and a second end selectively coupled to a first plate receiving end or a ground;
a plurality of second switches, wherein each second switch comprises a first end coupled to one of the plurality of second electrode plates, and a second end selectively coupled to a second plate receiving end, the ground or a driving signal end;
a control unit, for generating a control signal to control the first switch and the plurality of second switches;
a driving unit, coupled to the driving signal end, for generating a driving signal; and
a processing unit, coupled to the first plate receiving end, for receiving a first sensing signal through the first plate receiving end within a normal operation duration and accordingly determining a first capacitance corresponding to a first force;
wherein, within the normal operation duration, the control unit generates the control signal according to a plate connection configuration, the plate connection configuration comprises at least a part of the plurality of second electrode plates coupled to the ground or to be at a floating state and the remaining part of the second electrode plates coupled to the driving signal end,
wherein within the normal operation duration, the first end of the first switch is coupled to the first electrode plate and the second end of the first switch is coupled to the first plate receiving end according to the control signal, and the second end of at least a part of the plurality of second switches are coupled to the ground or at the floating state and the second end of the remaining part of the second switches are coupled to the driving signal end according to the control signal and the plate connection configuration, so as to connect the corresponding second electrode plates to the driving signal end,
wherein within a testing duration, the processing unit sets up the plate connection configuration, and when different forces are applied on the first electrode plate, the processing unit detects a capacitance of the first electrode plate corresponding to different forces and detects a compressed electrode area according to the plate connection configuration.

3. The pressure sensor of claim 2, comprising:
a storage unit, for storing the plate connection configuration and the corresponding relationship between the first capacitance and area of the compressed electrode based on the plate connection configuration corresponding to different forces.

4. The pressure sensor of claim 2, wherein when applying the first force on the first electrode plate, the control unit generates the control signal according to the plate connection configuration so as to connect the first end of the first switch to the first electrode plate and connect the second end of the first switch to the first plate receiving end, connect at least the part of the second end of the plurality of second switches to the ground or switch at least the part of the second end of the plurality of second switches to the floating state and connect the remaining part of the second end of the plurality of second switches to the driving signal end, the driving unit inputs the driving signal to the connected second electrode plate via the driving signal end, the processing unit receives the first sensing signal from the first plate receiving end and accordingly determines the first capacitance corresponding to the first force.

5. The pressure sensor of claim 2, wherein when applying the first force on the first electrode plate, the control unit generates the control signal so as to connect the first end of the first switch to the first electrode plate and connect the second end of the first switch to the ground to switch the first electrode plate to the ground, and connect each second switch to a corresponding second plate receiving end respectively so as to connect each second electrode plate to the corresponding second plate receiving end, and the processing unit receives a plurality of second sensing signals from the second plate receiving end of the corresponding plurality of second electrode plates, and accordingly detects a plurality of second capacitances corresponding to the plurality of second electrode plates and determines the compressed second electrode plate from the plurality of second electrode plates, and the processing unit calculates the area covered by the compressed second electrode plate, so as to obtain the compressed electrode area corresponding to the first force.

6. The pressure sensor of claim 5, wherein for each second electrode plate, the processing unit receives a second sensing signal from the second plate receiving end corresponding to the each second electrode plate and accordingly determines the second capacitance corresponding to the each second electrode plate, when the second capacitance corresponding to the each second electrode plate is larger than or equal to a predetermined capacitance, the processing unit determines that the each second electrode plate is the second electrode plate being compressed, and when the second capacitance corresponding to the each second electrode plate is smaller than the predetermined capacitance, the processing unit determines that the each second electrode plate is the second electrode plate not being compressed.

7. A pressure sensing method, applied for a pressure sensor, the pressure sensor comprises an elastic member, a first electrode plate and a plurality of second electrode plates, the elastic member is disposed between the first electrode plate and the plurality of second electrode plates, the pressure sensing method comprises:
setting up a plate connection configuration, the plate connection configuration comprises at least a part of the plurality of second electrode plates connected to a ground or switched to a floating state and the remaining second electrode plates connected to a driving signal end; and
applying different forces on the first electrode plate, and detecting the first capacitance and the compressed electrode area corresponding to different forces according to the plate connection configuration; and
storing the plate connection configuration and the corresponding relationship between the first capacitance and area of the compressed electrode of the plate connection configuration based on the plate connection configuration corresponding to different forces.

8. The pressure sensing method of claim 7, wherein the step of applying different forces on the first electrode plate, and detecting the first capacitance and the compressed electrode area corresponding to different forces according to the plate connection configuration comprises:
when applying a first force on the first electrode plate, connecting the first electrode plate to a first plate receiving end, and connecting at least the part of the second end of the plurality of second electrode plates to the ground or switching at least the part of the second end of the plurality of second electrode plates to the floating state and connect the remaining part of the second electrode plates to the driving signal end according to the plate connection configuration; and
inputting a driving signal to at least the part of the plurality of second electrode plates via the driving signal end, receiving a first sensing signal from the first plate receiving end and accordingly determining the first capacitance corresponding to the first force.

9. The pressure sensing method of claim 7, wherein the step of applying different forces on the first electrode plate, and detecting the first capacitance and the compressed electrode area corresponding to different forces according to the plate connection configuration comprises:
when applying a first force on the first electrode plate, switching the first electrode plate to a ground, and connecting the plurality of second electrode plates to one corresponding second plate receiving end respectively; and
detecting a plurality of second capacitance corresponding to the plurality of second electrode plates and accordingly determining the compressed second electrode plate from the plurality of second electrode plates; and
calculating the area covered by the compressed second electrode plates, so as to obtain the compressed electrode area corresponding to the first force.

10. The pressure sensing method of claim 9, wherein the step of detecting the plurality of second capacitance corresponding to the plurality of second electrode plates and accordingly determining the compressed second electrode plate from the plurality of second electrode plates comprises:
for each second electrode plate, receiving a second sensing signal from the second plate receiving end corresponding to the each second electrode plate and accordingly determining the second capacitance corresponding to the each second electrode plate;
when the second capacitance corresponding to the each second electrode plate is larger than or equal to a predetermined capacitance, determining the each second electrode plate is the second electrode plate being compressed; and
when the second capacitance corresponding to the each second electrode plate is smaller than the predetermined capacitance, determining the each second electrode plate is the second electrode plate not being compressed.

\* \* \* \* \*